Patented Oct. 5, 1937

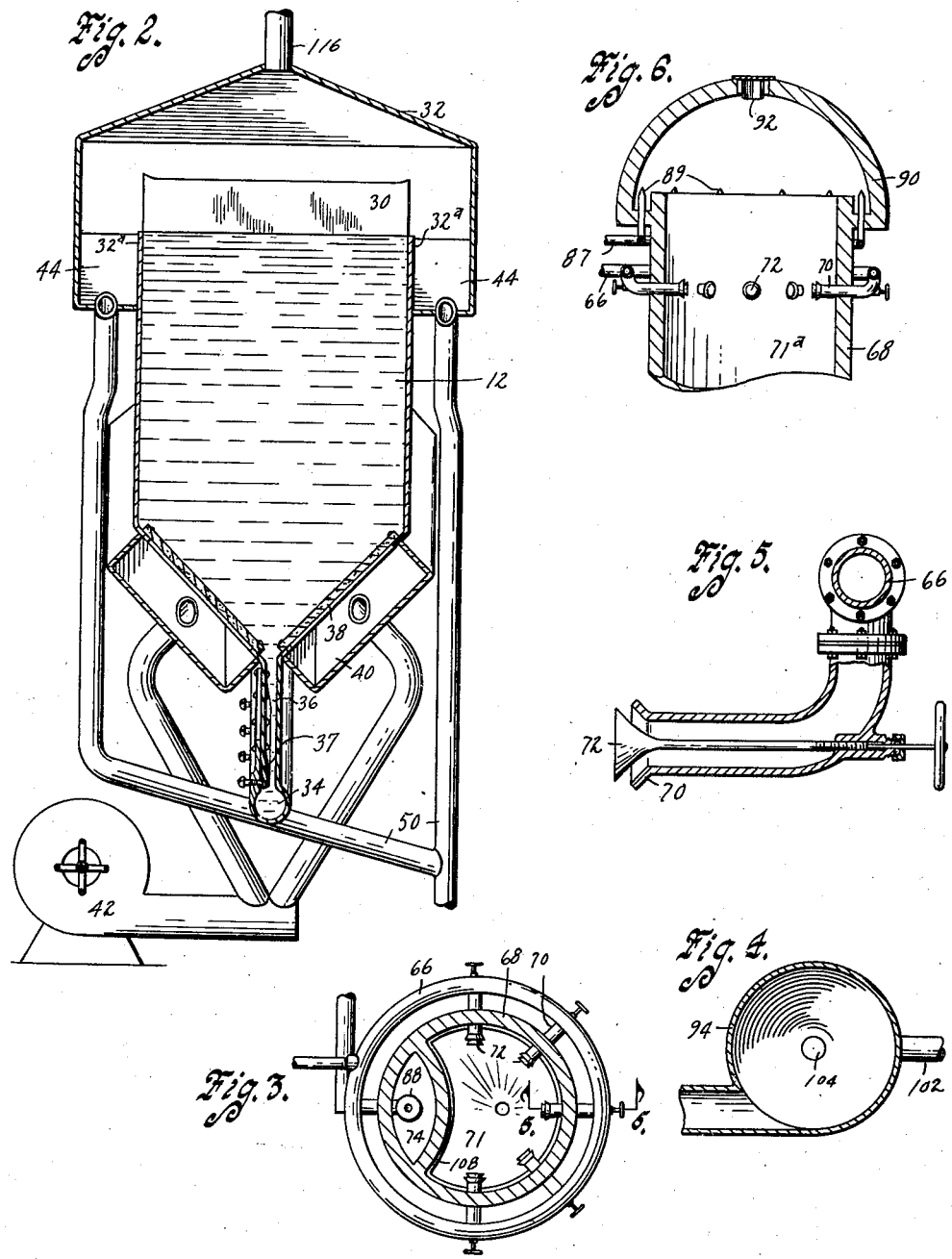

2,094,909

UNITED STATES PATENT OFFICE 2,094,909

APPARATUS FOR TREATMENT OF SEWAGE

Robert W. Baily, Philadelphia, Pa., and Newenham A. Gray, Brooklyn, N. Y.

Application March 2, 1933, Serial No. 659,360

2 Claims. (Cl. 210—2)

An object of our invention is to provide a method for rapidly removing dissolved, suspended and entrained substances from raw sewage, the steps of which are comparatively simple and to provide an apparatus of simple and durable construction for performing the method.

A further object is to provide a method for rapidly removing dissolved, suspended and entrained substances from raw sewage without the delay attendant upon the present practise of subjecting the sewage to bacteriological action, leaving the liquids in the sewage in a condition free from noxious or polluting matter and suitable for ejection into streams or even into sources of public water supply, combined with a means for collecting the organic and dissolved matter, precipitates, coagulates and solids and a method for subjecting these matters to direct heat in a manner to dehydrate them, destroy noxious gases and odors and leave a dry and innocuous residue which may be easily disposed of.

A further object is to provide a method for separating, solids, colloids and dissolved, suspended and entrained substances from raw sewage involving the use of a frothing agent, a neutralizing agent and a coagulating agent, or any one of these agents, the method involving a frothing operation which is performed by discharging air below the surface of the sewage when dosed with the agents to cause a froth carrying a portion of the entrained solids, dissolved matter, precipitates and coagulates to float on the surface of the sewage, which froth and its entrained substances are discharged into a dehydration chamber to both dehydrate them and to burn the combustible portions of the solids and colloids and of the frothing agent, if there are any, to thus assist in the dehydration of substances which are not combustible.

A further object is to collect suspended and entrained solids resulting from precipitation and coagulation, hereinafter referred to as sludge, after the frothing operation and dewater them and then disintegrate and discharge them under pressure into a dehydration chamber along with the froth and its entrained sludge, whereby combustion of the combustible portions of the mass occurs to aid dehydration and produce innocuous gases which can be discharged to atmosphere without odor and an innocuous residue which can be used for back-filling or fertilizer purposes, all bacteriological organisms having been destroyed by the method and all possibility of pollution being eliminated so that it is practical to operate the method in densely populated areas, thus eliminating the expense of relegating the sewage disposal plant to suburban areas and the consequent costly sewage extensions and pumping plants.

A further object is to provide a method and apparatus for the treatment of sewage which eliminate a large investment in real estate because of large plants being necessary when the method of activation and putrefaction in agitating or septic tanks is practised, with the organic matters contained in suspension being transformed into a flocculent precipitate which, together with inorganic matters, are segregated in sedimentation tanks and therefrom extracted as a sludge, such a method requiring from forty-eight hours to sixty days time for proper treatment and consequently requiring much space besides being a public nuisance by reason of odors emanating therefrom and also being unsightly.

A further object is to provide an apparatus in which sewage is treated by a neutralizing, a coagulating and a frothing agent in such manner that oils, gasoline or chemical substances already in the sewage are not a detriment, neither do they impede the development of the treatment and in the case of oils, assist rather than impede the treatment.

With these and other objects in view, our invention consists in the steps of the process hereinafter outlined and in the construction, arrangement and combination of the various parts of the apparatus, whereby the objects contemplated are attained, as hereinafter more fully set forth, pointed out in our claims and illustrated in the accompanying drawings, in which the apparatus is disclosed.

Figure 2 is a vertical cross sectional view on the line 2—2 of Figure 1.

Figure 3 is a horizontal cross sectional view on the line 3—3 of Figure 1.

Figure 4 is a horizontal cross sectional view on the line 4—4 of Figure 1.

Figure 5 is a vertical sectional view on the line 5—5 of Figure 3; and

Figure 6 is a sectional view similar to a portion of Figure 1 showing a modified construction of the apparatus.

Figure 1:
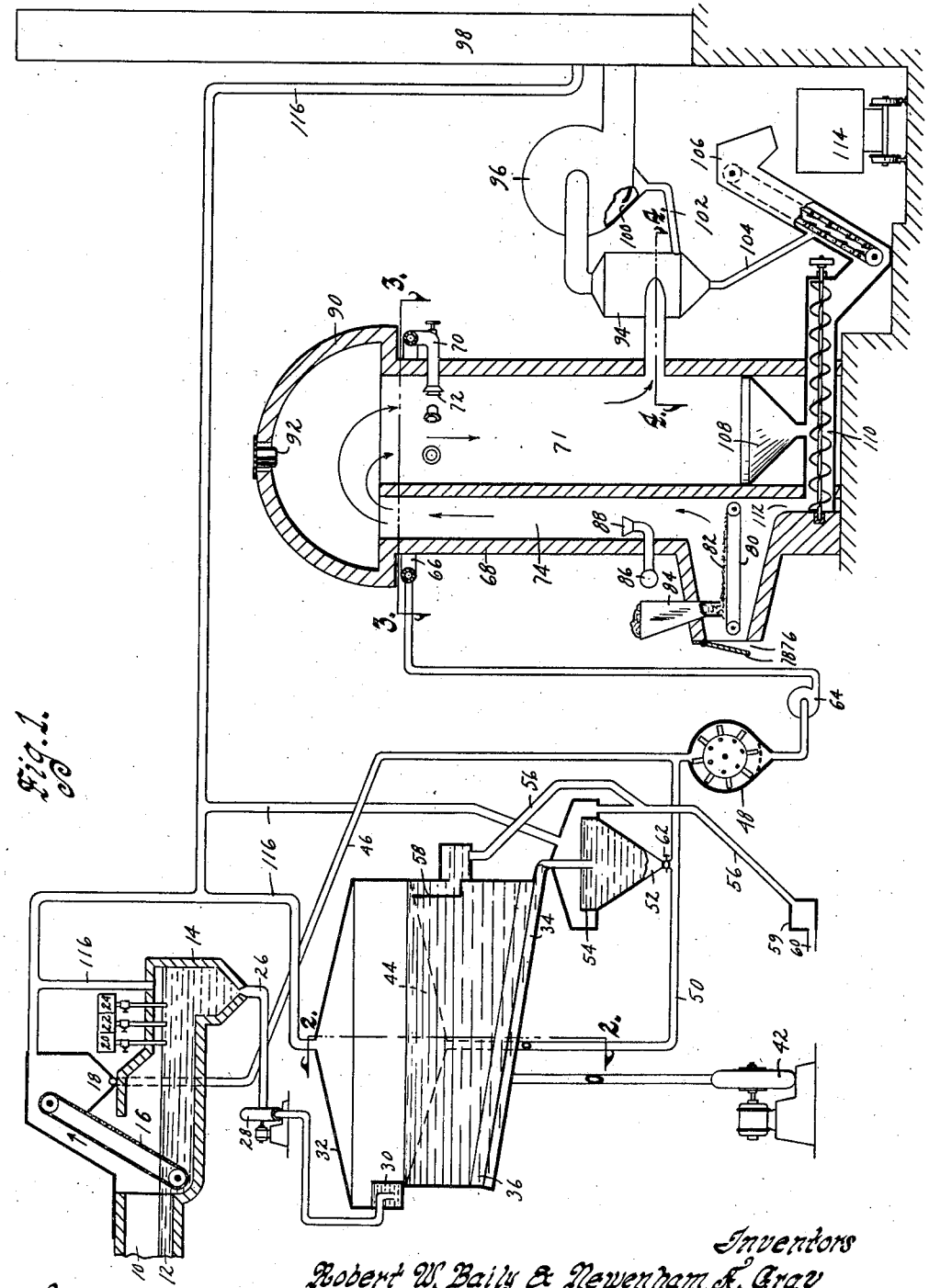
Figure 1 is a diagrammatic view of the complete apparatus used for practising our method of treatment for raw sewage.

We will first describe our apparatus and then its use for practising our process.

*Apparatus for raw sewage treatment*

Our apparatus includes an incoming sewer 10 containing raw sewage 12. This sewage is that which comes directly from the sewer system 10 extending from the various residences and buildings within a city. A receiver tank 14 is provided having therein a perforated conveyor 16 adapted for the purpose of screening out the larger particles and solids coming in with the raw sewage 12. These are discharged into a hopper 18.

Associated with the receiver tank 14 are reservoirs 20, 22 and 24 for a neutralizing agent, a coagulating agent and a frothing agent, respectively.

It may here be mentioned that the composition of raw sewage is:

1. Water, the diluent and carrier;
2. Organic and inorganic substances in solution in the diluent;
3. Organic and inorganic substances in suspension (solids) in the diluent;
4. Organic and inorganic substances (solids) entrained by the diluent; and
5. Colloids in pseudo-solution in the diluent.

In order to obtain a clear effluent from sewage, it is necessary.

1. To precipitate the substances in the solution in the form of insoluble salts which will either be solids in suspension in the diluent, or solids which will sink to the bottom or rise to the top of the diluent;
2. To coagulate the colloids in the form of insoluble coagulates which will be either solids in suspension in the diluent or solids which will sink to the bottom or rise to the top of the diluent; and
3. To separate the precipitates, the coagulates and all other solids in suspension or entrained from the diluent.

It is obvious that precipitation and coagulation must of necessity precede any and all attempts to separate the solids from the diluent. All of the substances contained in the diluent must be, by the admixture of suitable compounds, transformed into insoluble solids which, whether heavier or lighter than the diluent, are amenable to separation, even though they remain suspended in the diluent.

Precipitation is caused by the addition of a neutralizer such as milk of lime, milk of magnesia, sulphuretted hydrogen, ammonia water or oxygen. Some of these are too expensive to use, milk of lime and oxygen (the oxygen of the air) being both cheap and easily obtained.

It is, of course, not possible to precipitate all of the substances in solution in the diluent and neither is it necessary, it being sufficient to precipitate the greater percentage of them so that those remaining in the diluent will be so small as to cease to be injurious (some of them even in large quantities being non-injurious).

It is therefore necessary to add the precipitant or neutralizer and it is imperative that the quantity of neutralizer be in excess of the strict requirements of precipitation for reasons which will hereinafter be apparent. In this connection, any neutralizer not absorbed in the operation of precipitation will be precipitated in the diluent by the carbonic acid of the air used in separation.

With respect to coagulation, ferrous sulphate or copperas, industrial alum, alumino-ferric or caustic lime can be used. Halogen chlorides can also be used, but they are too expensive.

If the effluent is to be discharged to waste, ferrous sulphate will be found the best and cheapest coagulant. If the effluent is to be chlorinated and filtered for subsequent use as potable water, then industrial alum is best, the reason being that ferrous sulphate cannot be eliminated from the effluent and though not injurious per se, its presence in drinking water is not desirable. Industrial alum may be eliminated from the effluent by aeration and in the filter beds. Hence, its presence in drinking water can be controlled.

Coagulation of the colloids is impossible in an acid or acidulated medium or diluent and for that reason, neutralization must precede or be concurrent with coagulation. Usually concurrent admixture suffices.

The admixture of a coagulant to the raw sewage is imperative for the following reasons. Colloids are composed of nuclei of protein, gelatin, purin and fats, protein, which affords food for the proliferation of bacterial life, being arrested in the coagulate by the coagulation step of the method. A good effluent must be free of substances giving life or affording a locus for bacterial proliferation and to obtain this freedom, the cheapest way is coagulation.

Coagulation is accelerated by neutralization and aeration. In the present day plants, aeration and neutralization by caustic lime is practised, the plants being of the batching type. In our case, however, we desire to dispense with the batching plant because of the large investment and we wish therefore to coagulate as a constant process and rapidly. To do this, the addition of a coagulant, more active than either caustic lime, milk of lime, or air, is imperative.

An outlet 26 is provided for the dosed sewage. The outlet extends to a pump 28 which pumps the dosed sewage into a weir box 30. The weir box 30 is located upon an aeration and separation tank 32. The pump 28, aside from serving as a pump, serves as a mixer for mixing the neutralizing, coagulating and frothing agents with the raw sewage.

The tank 32 has a bottom which slopes from the sides toward its center and terminates in a longitudinal slot-like passageway 36 having a collector duct 34 (see Figure 2) along its lower side.

The flow of the sewage 12 into the duct 34 may be regulated in any desired manner, for instance, by a movable blade 37, the position of which can be regulated by screws 39 or the like.

By compelling solids precipitated to the bottom of the tank 32 to crowd together at the entrance to the passageway 36, we remove from these solids a large proportion of diluent under the influence of superimposed hydrostatic pressure, so that the partially dewatered sediment passes through the passageway 36 as a ribbon of solids, preventing the escape of much superimposed diluent into the duct 34.

The major portion, or all of the bottom of the tank 32 is formed of pads 38 of porous material, such as canvas or perforated rubber sheets or the like which cover wind boxes 40. Air under pressure is supplied by a blower 42 to the wind boxes 40. This air escapes through the porous pads 38 and in fine bubbles, passes up through the sewage 12, the pressure produced by the blower necessarily being great enough to overcome the hydrostatic pressure of the sewage 12 on the porous pads 38.

A launder 44 is arranged along each side of the tank 32. The sides of the tank form weirs, as indicated at 32a, for the froth on the surface of the sewage 12 to overflow into the launders 44.

A conduit 46 leads from the hopper 18 to a disintegrator 48. Conduits 50 lead from the launders 44 to the disintegrator 48. The sludge received in the disintegrator 48 is broken up, particularly the froth, and this can best be done in a disintegrator of the hammer mill type.

The heavier particles in the sewage 12 precipitate to the duct 34 and from there flow into a dewatering tank 52. It has a weir wall 54 for excess water to overflow and enter a conduit 56. The tank 32 has a submerged weir wall 58 over which water in the tank 32 flows to enter the conduit 56. The conduit leads to a chlorinator 59 from which a conduit 60 leads. The chlorinator is adapted for chlorinating the water from the conduit 56 so that it is aseptic when it issues from the conduit 60.

Sludge precipitated in the dewatering tank 52 enters the conduit 50 and finds its way to the disintegrator 48. The flow of sludge can be controlled by a valve 62, if desired.

The froth with its entrained solids, the solids from the dewatering tank 52 and the larger screenings from the screen 16 are all disintegrated and the froth broken down in the disintegrator 48 and then forced by a pump 64 to a bustle pipe 66. The bustle pipe surrounds a dehydrator 68 and has a plurality of nozzles 70 extending thereinto. Each nozzle has a cone-shaped spreader 72 adjustable as illustrated in Figure 5 to provide a non-clogging self cleaning atomizer, the capacity of which can be regulated. These nozzles terminate in a dehydration chamber 71 of the dehydrator 68.

The dehydrator 68 includes a combustion chamber 74 into which air containing oxygen can enter at 76. An adjustable door 78 is provided for the opening 76.

Any desired fuel can be burned in the combustion chamber 74. We show a traveling grate 80 on which coal or other fuel 82 can be burned, it being supplied preferably from a hopper 84.

We also show an oil or gas line 86 terminating in a nozzle 88 by which an oil or gas flame can be utilized for heating the combustion chamber 74. Pulverized fuel also can be used.

The chambers 71 and 74 are connected by a dome 90 having an outlet check valve 92 to relieve excess pressures. Combustion in the chamber 74 produces hot gases which flow downwardly through the dehydration chamber 71 and out through a centrifugal separator 94 and a blower 96 to a stack 98. The blower 96 has a slot opening 100 for fly ash to flow through a conduit 102 back to the base of the separator 94 and together with settlings in the separator to flow through a conduit 104 to a conveyor 106.

In the bottom of the dehydration chamber 71 we provide a hopper 108 discharging into a conveyor 110. A passageway 112 communicates with the combustion chamber 74 to receive ashes from the grate 80 to convey them as well as material from the hopper 108 to the conveyor 106. The residue discharged from the conveyor 106 may be dropped into a gondola car 114 or other conveyance adapted to transport the residue to a suitable place of deposit.

A conduit system 116 connects the receiver tank 14, the aeration and separation tank 32 and the dewatering tank 52 with the stack 98 so that any odors arising from these various tanks can be discharged with the hot gases and moisture issuing from the blower 96 and discharging to atmosphere.

*Method for raw sewage treatment*

Our method involves initial removal of the larger particles from the raw sewage 12 by the screen 16, the disintegrating of these particles in the disintegrator 48, the forcing of them by the blower 64 through the nozzles 70 into the dehydration chamber 71 and the dehydration of the particles as well as the combustion of any combustible portions thereof in the chamber 71, producing an innocuous gas discharged into the stack 98 and innocuous and sterile residue dropping into the hopper 108 from which it is conveyed to the car 114.

Our process further involves the dosage of the sewage 12 with a neutralizing agent, a coagulating agent and a frothing agent as well as the production of a froth by discharging air below the surface of the sewage after it has been dosed.

The agitating and separating action in the tank 32 aids proper neutralization and coagulation. The action of these agents and of the frothing agent is interlocking and interdependent. The stirring of air passing through the diluent accelerates the diffusion of both the neutralizer and the coagulant. The oxygen of the air accelerates neutralization and coagulation, the same oxygen also ridding the effluent of excess neutralizer and coagulant (in the case of alum).

The diluent and its solid constituents enter the separation tank at the left end and travel an appreciable time through a screen of rising air bubbles from the pads 38 and during such travel, the diluent is gradually purged of its obnoxious constituents, the colloids are coagulated and at the right end of the separation tank, nothing remains but such excesses of neutralizer and coagulant not absorbed by their typical function and precipitated there by the rising screen of air bubbles. In other words, the diluent and its concomitants travel across a screen of air bubbles and this is the primary object of the separation tank.

With respect to the frothing agent, it can be an animal, a mineral or a vegetable oil, or a chemical substance such as amyl alcohol, amyl acetate, phenol, cresol camphor, etc.

The result we are aiming at is a thin blanket of froth on the surface of the diluent in the separation tank to help convey the solids which have risen to the surface over the weirs 32a and into the collecting launders 44. The froth blanket assists scavenging of the solids propelled upwardly into it.

In the presence of an air bubble, a frothing agent films the bubble. If more air bubbles are present than there is frothing agent available, free air bubbles will ascend with the filmed bubbles. The volume of air bubbles, filmed and free, passing at any time through the diluent has the effect of reducing the density of the medium, whereupon a suspended particle which would remain suspended in dormant diluent of a given density, can no longer remain suspended because of a lesser density of the diluent caused by the presence of air bubbles.

The particle must either sink or rise and if it ascends, its velocity will be accelerated by the stream lines of the rising bubbles, while if it descends, it will be retarded thereby. Thus the effect of bubbling air through the diluent is to change the density of the medium and therefore disturb the equipoise of a suspended particle for thus separating the particle from the diluent.

The air from the wind boxes 40 streaming through the porous pads 38 also agitates the sewage in the tank 32, causing precipitation of dissolved substances and coagulation of colloids by virtue of the chemical agents introduced as dosage for that purpose and to precipitate the solids of greater density to the bottom of the tank 32 where, due to the slope and the action of the bubbles issuing from the pads 38, the solids tend to pass through the passageway 36 and into the duct 34 from which they flow to the dewatering tank 52. The solids, dissolved substances and coagulates precipitate therein, producing a clear effluent overflowing the weir 54 and finding its way to the chlorinator 59 in which it may be dosed with chlorine or other disinfecting chemical.

The weir 58 is slightly lower than the weirs 32a and consequently clear effluent will overflow the weir 58 and enter the conduit 56 along with the effluent from the dewatering tank 52. The weir 58 being submerged will cause water only to overflow it, while the weirs 32a will have froth only overflowing them.

The precipitated solids, dissolved substances and coagulates in the dewatering tank 52 are admitted to the disintegrator 48 so that they likewise can be discharged through the nozzles 70 for dehydration and combustion of the combustible portions thereof. The innocuous residue resultant after dehydration and combustion of the discharge from the nozzles 70 settles by gravity into the hopper 108 while the innocuous gases enter the centrifugal separator 94 so that any particles or dust from the gases can be separated and conducted to the conveyor 106.

In the blower 96 there is a centrifugal action tending to drive any of the remaining particles to the periphery of the casing which will be discharged through the slot 100 to return to the separator instead of being discharged into the stack 98.

From the stack there will be a vapor laden discharge entirely innocuous as all bacteriological organisms and combustible materials have been destroyed or have been burned.

It is obvious that various automatic controls for the temperature of the dehydrator 68 and for the flow of sewage and agents during the process can be provided, if desired. In Figure 6, we have shown a modified construction for the dehydrator in which nozzles 89 are connected with a gas, oil or pulverized fuel supply pipe 87 so that the dome 90 forms a combustion chamber and the entire cross sectional area of the dehydrator 68, as indicated at 71a, is utilized as a dehydration chamber.

This change as well as others can be made in the apparatus and steps of the process can be somewhat modified without departing from the real spirit and purpose of our invention. We therefore intend to cover by our claims, such modified structures and changes which involve mere mechanical equivalents as will be reasonably included within their scope.

We claim as our invention:

1. Apparatus for the treatment of raw sewage including means for dosing the sewage with a frothing agent, a neutralizing agent and a coagulating agent, an elongated container for the sewage having a longitudinally sloping bottom, a restricted slot-like opening throughout the length of said bottom, means for discharging air into the bottom of said container to act upon said sewage and frothing agent to form a froth rising to the surface of the sewage and carrying with it a portion of the solids, dissolved matter, precipitates and coagulates entrained in the sewage, a weir at the top of said container over which said froth may flow, an outlet for the purified liquid communicating with said container and means at the bottom of said container to collect the remaining solids and entrained matter precipitated thereto.

2. Apparatus for the treatment of raw sewage including means for dosing the sewage with a frothing agent, a neutralizing agent and a coagulating agent, a container for the sewage, means for discharging air into the bottom of said container to act upon said sewage and frothing agent to form a froth rising to the surface of the sewage and carrying with it a portion of the solids, dissolved matter, precipitates and coagulates entrained in the sewage, means including a weir at the top of said container to collect froth and the solids, dissolved matter, precipitates and coagulates carried thereby as fast as they rise to the surface of the sewage and a restricted slot at the bottom of said container and a conduit communicating with said container through said slot to collect the remaining solids, dissolved matter, precipitates and coagulates precipitated thereto, said container having a bottom which slopes toward said slot and a purified liquid outlet communicating with said container.

ROBERT W. BAILY.
NEWENHAM A. GRAY.